United States Patent
Callahan et al.

(10) Patent No.: US 8,620,812 B2
(45) Date of Patent: Dec. 31, 2013

(54) AUTHENTICATED THIRD-PARTY CHECK CASHING

(75) Inventors: Nicole H. Callahan, Denver, CO (US); Mike Clouthier, Highlands Ranch, CO (US); Chris T. Cox, Denver, CO (US)

(73) Assignee: First Data Corporation, Greenwood Village, CO (US)

( * ) Notice: Subject to any disclaimer, the term of this patent is extended or adjusted under 35 U.S.C. 154(b) by 98 days.

(21) Appl. No.: 11/966,223

(22) Filed: Dec. 28, 2007

(65) Prior Publication Data

US 2009/0171827 A1 Jul. 2, 2009

(51) Int. Cl.
*G06Q 40/00* (2012.01)
(52) U.S. Cl.
USPC .......................................................... 705/45
(58) Field of Classification Search
USPC .......................................................... 705/45
See application file for complete search history.

(56) References Cited

U.S. PATENT DOCUMENTS

| | | | |
|---|---|---|---|
| 6,957,770 B1 * | 10/2005 | Robinson ...................... | 235/382 |
| 7,257,246 B1 * | 8/2007 | Brodie et al. ................. | 382/137 |
| 7,287,689 B2 | 10/2007 | Tidwell et al. | |
| 2002/0112177 A1 * | 8/2002 | Voltmer et al. ............... | 713/200 |
| 2002/0174334 A1 * | 11/2002 | Meadow et al. .............. | 713/168 |
| 2004/0133474 A1 * | 7/2004 | Tami et al. .................... | 705/16 |
| 2006/0106717 A1 * | 5/2006 | Randle et al. ................. | 705/45 |
| 2006/0177108 A1 * | 8/2006 | Yashiki ......................... | 382/115 |
| 2007/0119923 A1 * | 5/2007 | Garrison et al. ............. | 235/380 |
| 2007/0279187 A1 * | 12/2007 | Hekmatpour et al. ....... | 340/5.83 |
| 2007/0288320 A1 * | 12/2007 | Cooper et al. ................ | 705/16 |

OTHER PUBLICATIONS

PCT International Search Report and Written Opinion mailed Feb. 17, 2009; International Application No. PCT/US2008/087776, 12 pages.

\* cited by examiner

*Primary Examiner* — Hani M Kazimi
*Assistant Examiner* — Hatem M Ali
(74) *Attorney, Agent, or Firm* — Kilpatrick Townsend & Stockton, LLP

(57) ABSTRACT

Tools for facilitating the process of providing presentation instrument redemption services, including without limitation tools that implement techniques for authenticating the identity of a check cashing customer through the use of biometric data that is derived from one or more biometric characteristics of the customer. The tools can be used to enroll the customer in a check cashing program, using biometric data as an authentication key. Thereafter, when the customer attempts to redeem a presentation instrument, the customer can provide the same biometric data, and the tools can authenticate the identity of the customer based one the biometric data. The tools can implement additional risk-prevention measures, such as risk-profiling routines, which can be used to estimate the risk of a fraudulent transaction, based on a variety of risk factors associated with the customer and/or the requested transaction.

24 Claims, 6 Drawing Sheets

AUTHENTICATED THIRD-PARTY CHECK CASHING

FIELD OF THE INVENTION

The present invention relates, in general, to check cashing and other payment-instrument redemption services, and more particularly, to tools for using biometric data to authenticate the identity of customers for such services.

BACKGROUND

There has long been a demand for the ability to redeem a presentation instrument at locations other than the issuer of the presentation instrument. (As used herein, the term "presentation instrument" means any type of financial instrument that is drawn by a payor, in favor of a payee, who generally also is the holder of the instrument. Examples of payment instruments include, merely by way of example, many different types of payment draft instruments such as checks, including without limitation, personal checks, business checks, payroll checks, government checks, and the like). For example, the holder of a check drawn by a third party might want to be able to endorse the check and redeem it for cash (an action commonly referred to as "cashing" the check).

Traditionally, the holder of the presentation instrument has been able to redeem a presentation instrument in this manner either at the financial institution from which the instrument was issued, or at a financial institution at which the holder has an account. This limitation on redemption locations produces substantial inconvenience for the holder of the instrument, however. For example, if the holder of a check did not have a deposit account with a financial institution, the holder generally would be limited to redemption of the check at the financial institution from which it was issued, which might be in an inconvenient location for the holder.

To address this need, a variety of different merchants offer redemption (generally referred to herein as "check cashing") services, in which a holder of a presentation instrument (generally referred to herein as a "check cashing customer" or merely as a "customer") can redeem (endorse and/or exchange) a presentation instrument for cash, and the merchant will then redeem the instrument at the issuing institution (sometimes through an additional intermediary). Such merchants include, merely by way of example, banks and other financial institutions, grocery stores, money transfer service providers, and dedicated check cashing merchants. Often, a fee will be charged for such services, generally in the form of a deduction from the amount of cash provided in return for the redeemed instrument.

The redemption of presentation instruments provides numerous opportunities for fraud. Merely by way of example, a check-cashing customer might forge a presentation instrument and then attempt to redeem that instrument. As another example, a customer might obtain (through various techniques) a valid presentation instrument written in favor of a different entity and then attempt to redeem the instrument by impersonating that entity. Other possibilities for fraud are possible as well.

Hence, in order to limit the risk of participating in a fraudulent transaction, a merchant must attempt to ensure, first, that the presentation instrument is valid and, second, that the customer is the entity in favor of whom the presentation instrument is written. Various service providers have attempted to fill this need, for example, by verifying the validity of the check. All of these systems, however, presume that the identity of the customer is in fact correct. Through the simple act of assuming a false identity, a check-cashing customer is often able to avoid most, if not all, of the anti-fraud measures implemented by the check cashing service provider.

Hence, there exists in the art a need for tools that provide more robust identity-verification of customers seeking to redeem presentation instruments and/or risk reduction for merchants performing check cashing services.

BRIEF SUMMARY

Embodiments of the invention thus provide tools for facilitating presentation instrument redemption services. In a particular aspect, these tools comprise techniques for authenticating the identity of a check cashing customer through the use of biometric data that is derived from one or more physical characteristics (e.g., fingerprints, vein patterns, hand geometries, iris patterns, facial structure, handwriting patterns, keystroke entry patterns, etc.) of the customer. In a particular embodiment, the customer enrolls at a merchant location by providing biometric data, along with a verifiable form of identification (such as a driver's license, a passport, and/or a Mexican Matricula Consular identification, to name a few examples). This information can be used to enroll the customer in a check cashing program provided by a check cashing authorization system. Thereafter, when the customer attempts to redeem a presentation instrument, the customer provides the same type of biometric data, and the tools can authenticate the identity of the customer using this invention. By verifying the identity of the customer in this way, such embodiments beneficially reduce the risk that requested redemption transaction will be fraudulent.

In another aspect, additional risk-prevention measures can be implemented as well. Merely by way of example, the tools of the invention can be configured to implement risk-profiling routines, which can be used to estimate the risk of a fraudulent transaction, based on a variety of risk factors associated with the customer him- or herself, the presentation instrument and/or an account on which the presentation instrument is drawn, the identity of the entity writing the presentation instrument (e.g., the holder of a depository account on which the instrument is drawn), and/or other unique aspects of the transaction (e.g., time and location of the proposed transaction).

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

For example, one set of embodiments provides systems, including without limitation systems for enrolling customers in a check cashing program and/or systems for approving a check cashing request. In an aspect, such systems can be implemented in a relationship between a financial institution, a financial transaction provider, and a check-cashing customer, a system for approving a check-cashing request.

An exemplary system in accordance with some embodiments comprises a host computer system. In an aspect, the host computer comprises one or more first processors, a communication interface in communication with the one or more first processors, a data store (e.g., a database comprising one or more database tables) in communication with the one or more first processors, and/or one or more first computer readable media in communication with the one or more first processors. In another aspect, the one or more first computer readable media comprise a first set of instructions executable by the host computer system to perform one or more operations.

In one embodiment, the first set of instructions comprises instructions for receiving, via the communication interface, an enrollment request comprising a set of biographical information about the check-cashing customer and/or a first set of biometric data about the check-cashing customer. The first set of instructions might also include instructions for evaluating the set of biographical information against a first risk profile and/or instructions for enrolling the check-cashing customer in a check cashing program, based at least in part on an evaluation of the first set of biographical information. There might be further instructions for storing the first set of biometric data and the set of biographical information in the data store. In this way, for example, the system can be configured to enroll a customer in a check cashing program.

The computer system can also be used, in some cases, for evaluating and/or approving check cashing requests. In such embodiments, the set of instructions might further include instructions for receiving, via the communication interface, a second set of biometric data and a set of request information associated with the second set of biometric data. Additionally and/or alternatively, the first set of instructions might include instructions for evaluating the set of request information against a second risk profile and/or instructions for comparing the second set of biometric data with the first set of biometric data.

Based on the evaluation, the host computer might either approve or deny the check cashing request. Hence, the first set of instructions, in some embodiments, includes instructions for approving the request to redeem the presentation instrument, based at least in part on an evaluation of the set of request information and a comparison of the first set of biometric data with the second set of biometric data. Certain embodiments provide notification of the approval and therefore include instructions for transmitting, via the communication interface, an approval message indicating that the request to redeem the presentation instrument has been approved, so that the point of sale device can display an approval indication.

In another set of embodiments, the system further includes one or more point of sale devices in communication with the host computer. In one such embodiment, the system includes a biometric capture device configured to identify one or more physical characteristics of the check-cashing customer and/or to generate, from the identified one or more physical characteristics, the first set of biometric data about the check cashing customer. The point of sale device, then, might be in communication with the host computer system and/or the biometric capture device. (Optionally, the point of sale device might comprise the biometric capture device.) In an aspect, the point of sale device comprises a second processor and a second computer readable medium; the second computer readable medium might a second set of instructions executable by the point of sale device to perform one or more operations.

Merely by way of example, the second set of instructions might comprise instructions for receiving a biometric authentication enrollment request for the check-cashing customer. As noted above, biometric data from the customer can be used to authenticate/verify the customer's identity, so the second set of instructions might include instructions for communicating with the biometric capture device to receive the first set of biometric data for the check-cashing customer, instructions for prompting a user to provide a set of biographical information about the check-cashing customer and/or for receiving the set of biographical information about the check-cashing customer. There might also be instructions for associating the set of biographical information with the first set of biometric data. The point of sale device might also include instructions for transmitting, to the host computer system, an enrollment request comprising the associated set of biographical information and first set of biometric data.

Alternatively and/or additionally, a second point of sale device (which might be the same point of sale device) might comprise a third set of instructions. This third set of instructions might include instructions for receiving a set of request information concerning a request by the customer to redeem a presentation instrument; the set of request information, in an aspect, comprises information about the presentation instrument. The third set of instructions might also include instructions for associating the second set of biometric data with the set of request information, instructions for transmitting the associated second set of biometric data and set of request information to the host computer system. The third set of instructions might also include instructions for receiving, from the host computer system, an approval message indicating that the request to redeem the presentation instrument has been approved, and/or instructions for displaying an approval indication to indicate that the request to redeem the presentation instrument has been approved.

Another set of embodiments provides methods, including without limitation, methods of enrolling a customer in a check cashing program and/or approving a check cashing request. Such methods can be used, for example, in a relationship between a financial institution, a financial transaction provider, and a check-cashing customer.

One exemplary method comprises transmitting, from a point of sale device to a host computer, an enrollment request comprising a set of biographical information and a first set of biometric data. The host computer receives the enrollment request comprising the associated set of biographical information and first set of biometric data, and the method might further comprise enrolling the check-cashing customer at the host computer and/or storing the first set of biometric data at the host computer.

In an embodiment, the method includes receiving, at a point of sale device, a set of request information concerning a request by the customer to redeem a presentation instrument, the set of request information comprising information about the presentation instrument. A second set of biometric data about the customer may be generated at a second biometric capture device in communication with the second point of sale device and/or transmitted from the second biometric capture device to the second point of sale device.

The method then, might comprise receiving the second set of biometric data at the second point of sale device, associating the second set of biometric data with the set of request information and/or transmitting the associated second set of biometric data and set of request information from the second point of sale device to the host computer. After the second set of biometric data and associated set of request information is received by the host computer, the set of request information can be evaluated, at the host computer, against a risk profile, and/or the second set of biometric data can be compared with the first set of biometric data.

In one embodiment, the request is approved, based at least in part on an evaluation of the set of request information and/or a comparison of the first set of biometric data with the second set of biometric data. The method, then, might include transmitting, from the host computer to the second point of sale device, an approval message indicating that the request to redeem the presentation instrument has been approved, and/or displaying, at the second point of sale device, an approval indication to indicate that the request to redeem the presentation instrument has been approved.

Another exemplary method comprises receiving, at a host computer, an enrollment request comprising a set of biographical information about the check-cashing customer and a first set of biometric data about the check-cashing customer. The method, in an aspect, further comprises evaluating, at the host computer, the set of biographical information against a first risk profile and/or enrolling the check-cashing customer at the host computer, based at least in part on an evaluation of the first set of biographical information. The first set of biometric data and/or the set of biographical information may be stored at the host computer (for example, in a data store in communication with the host computer).

The method, in some embodiments, further comprises receiving, at the host computer, a second set of biometric data and a set of request information associated with the second set of biometric data. This set of request information may be evaluated, at the host computer, against a second risk profile, and/or the second set of biometric data may be compared (e.g., at the host computer) with the first set of biometric data.

Based at least in part on an evaluation of the set of request information and a comparison of the first set of biometric data with the second set of biometric data, the request to redeem the presentation instrument may be approved. Accordingly, the method might comprise transmitting, from the host computer to a point of sale device, an approval message indicating that the request to redeem the presentation instrument has been approved, so that the point of sale device can display an approval indication.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments of the invention may omit such features.

In an aspect, the tools of the invention provide enhanced fraud protection in the provision of a redemption service for presentation instruments (a service that, for ease of description is referred to herein as a "check cashing" service, although the use of this term should not be considered as limiting embodiments of the invention to merely cashing checks since any type of presentation instrument may be redeemed in accordance with embodiments of the invention). In a particular aspect, these tools, which can comprise, inter alia, systems, methods, and/or software programs, provide this protection through enhanced verification of the identity of the customer, i.e., the party seeking to redeem the presentation instrument. In another aspect, embodiments of the invention may include risk profiling techniques that further mitigate the risk that a check cashing transaction will be fraudulent.

Figure 1:
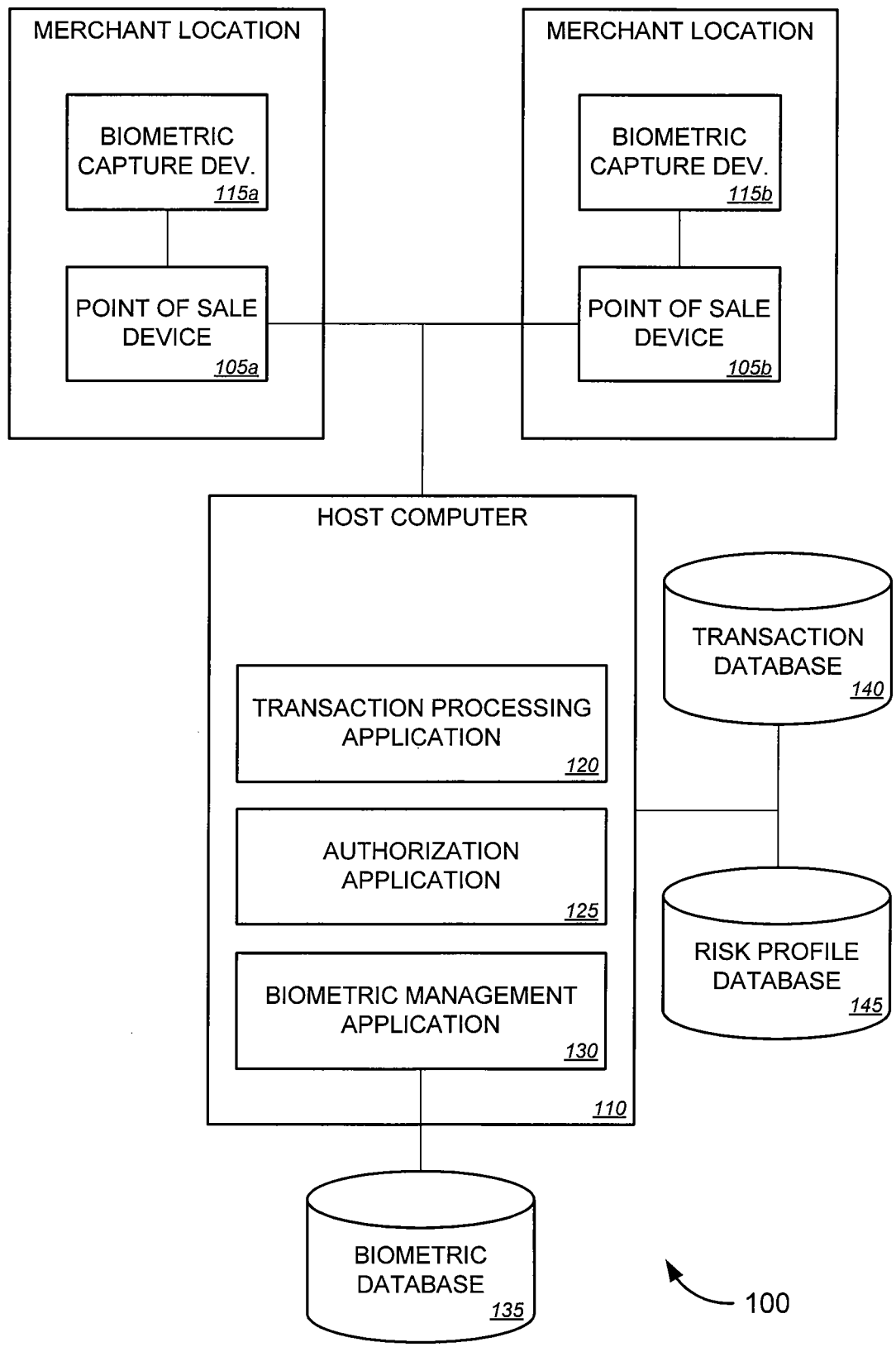
FIG. 1 is a block diagram illustrating a system for providing authenticated check cashing services, in accordance with various embodiments of the invention.

Many of the embodiments of the invention are implemented within a transaction processing system, an example of which is illustrated by FIG. 1. The system 100 of FIG. 1 can be used for a variety of purposes, including without limitation enrolling customers in an identity verification program and/or approving a check cashing request, as described in further detail below. One skilled in the art will appreciate that a financial intermediary, and specifically, a financial transaction provider (referred to herein as a "check processor") often will process and/or facilitate transactions involving presentation instruments, including without limitation check cashing transactions. Processing such a transaction might also include (but need not necessarily include) negotiating the presentation instrument on behalf of the merchant and/or the merchant's bank (using, for example, an automated clearing-house ("ACH"), and/or other various settlement processes, such as check truncation, substitute check and/or image replacement document processes, etc.). The system 100 may also be used for other purposes, such as for first-party check acceptance verification and/or authorization, and/or the like. (In fact, while the detailed description herein primarily discusses identity verification within the context of check cashing transactions, the enrollment and/or authorization operations easily could be carried out within the check writing and/or acceptance contexts as well.)

The system 100 comprises one or more point of sale ("POS") devices 105 in communication with a host computer 110. In an aspect, one or more of the POS devices 105 may be located at a merchant location. In some cases, a check cashing processor provides a POS device 105 for use by a merchant; in other cases, the merchant might obtain the POS device 105 independently. In some embodiments, multiple merchants may participate in the system 100 and/or a single merchant might have multiple locations. In such case, there may be a POS device 105 located at each merchant and/or location.

A POS device 105 can be any type of device that provides data communication with a host computer 110. Often, a POS device 105 will be a specialized terminal having specified hardware (including communication hardware for communicating with the host, and/or hardware for reading and/or scanning one or more types of financial instruments) and/or will be incorporated with a cash register. In other cases, a POS device 105 might be a general-purpose computer programmed to function as an interface to the host computer 110, perhaps with specialized input hardware for reading and/or scanning financial instruments.

In most cases, the POS device 105 will comprise one or more input devices, which can include, without limitation, keypads (alphabetic and/or numeric, etc.), magnetic stripe readers, bar code readers, input ports (for receiving input from other devices, such as biometric capture devices, personal computers, cash registers, etc.), and/or the like. The POS device 105 generally will also comprise one or more output devices (in addition to the communication hardware), such as a display (and/or an output port for communicating with an external display), a printer (and/or an output port for communicating with an external printer), output ports for providing data to a personal computer, cash register, and/or the like. One or more of these input and/or output devices (with might be incorporated within a single input/output device, in some cases) provide a user interface for the POS device 105, to allow interaction with a customer, a merchant (or, more specifically, an operator of the POS device 105 at a merchant location), etc.

The host computer 110, which can be any computer system (which might comprise one or more computers) that is capable of processing financial transactions and/or communicating with appropriate entities (including, without limitation, various financial institutions, an ACH, etc.) for performing methods of the invention. In a general sense, the host computer 110 is configured (through one or more software applications, which are generally stored on a computer readable medium accessible to the host computer 110 and which comprise instructions that are executable by the host computer 110) to perform a variety of operations for processing (or facilitating the processing of) financial transactions.

Of particular relevance to the present disclosure, the host computer 110 is configured generally to receive a request (e.g., from a POS device 105) to enroll a customer in a check cashing program. Based on the request, the host computer 110 enrolls the customer (subject to controls discussed in more detail below); thereafter, if the host computer 110 receives a request (again, likely from a POS device 105) to authorize a check cashing operation for the customer, the host computer 110 searches for the enrollment data for the customer, evaluates the proposed transaction, and returns (e.g., to the POS device 105) either an approval message or a declination message. (In some cases, the enrollment request might be received from a first POS device 105a and the check cashing transaction request might be received from a second POS device 105b, although this is not required.)

In one aspect of the invention, biometric data is used to identify the customer at enrollment, and thereafter to authenticate and/or validate the identity of the customer. Hence, in a set of embodiments, a POS device 105 comprises, and/or is in communication with, a biometric capture device 115. Any type of biometric capture device may be implemented in accordance with embodiments of the invention, including without limitation a number of commercially-available devices, such as the Microsoft™ Fingerprint Reader, the SecureGen™ Hamster III™, the Identix™ BioTouch™ USB Fingerprint Scanner, the IrisAccess™ 3000 iris scanner, the Fujitsu™ PalmSecure™, and others. More generally, examples of biometric capture devices are fingerprint scanners, retinal and/or iris scanners, iris scanners, handprint scanners, facial recognition devices, handwriting recognition devices, keypads, vein pattern scanners, microphones (e.g., for voice analysis), and/or the like. In an aspect, a biometric capture device 115 captures biometric data about a customer, by identifying a characteristic of the customer that is unique (or practically unique) to the customer. (The term "practically unique" describes a characteristic that may not be universally unique to a particular customer but that is sufficiently unusual that it can be used to distinguish that customer from other people with a sufficient degree of confidence to reduce to a negligible and/or acceptable level the risk that the customer is not the person the customer purports to be.)

The manner in which the biometric capture device 115 operates generally will be dependent on the nature of the device 115 and/or the physical characteristic being identified by the device 115. Merely by way of example, a fingerprint scanner generally will identify one or more fingerprints of the customer, using infrared scanning and/or other types of imaging. A keypad might record keystroke entry patterns through detecting and recording the order and/or timing in which keys on the keypad are pressed. Generally, biometric capture devices capture one or more physical characteristics and/or convert them into digital data that can be stored on physical and/or tangible computer readable media, transmitted electronically, and/or the like.

The host computer 110 may comprise one or more applications that support the functionality of the invention, including for example, by comprising instructions that are executable by a computer (such as the host computer) to perform operations in accordance with methods of the invention, as described in detail below. FIG. 1 illustrates one exemplary arrangement of such applications—in other embodiments, the functionality of the host computer might be allocated differently among these or other applications (and/or might be consolidated into a single application. Similarly, while FIG. 1 depicts the applications as executing on a single host computer 110, it should be appreciated that the functionality of these applications could be divided among a plurality of computers (e.g., each application could execute on a separate machine).

In the exemplary arrangement of FIG. 1, the host computer 110 executes a transaction processing application 120, which operates similarly to transaction processing applications known in the art. In an aspect, the transaction processing application is configured to be the point of communication between the host computer 110 and the point of sale devices 105a. The transaction processing application 120 might also handle other transaction processing tasks, such as communication with financial institutions and/or networks to process financial transactions, etc.

The host computer 110 also may execute an authorization application 125, which provides instruction for evaluating various requests to perform financial transactions. Of particular relevance to the present disclosure, the authorization application 125 performs various techniques to evaluate requests to enroll in a check cashing program and/or to redeem a presentation instrument, as described in more detail below.

In some embodiments, the host computer 110 executes and/or is in communication with a biometric management application 130. In some cases, the biometric management application 130 is a stand-alone application (which might execute either on the host computer 110 or another computer), which is configured to interface with other applications, including for example, the transaction processing application 120 and/or authorization application 125, while in other cases, the biometric management application 130 may be incorporated within one or more of those other applications. In a particular aspect, the biometric management application 125 provides decision support for the authorization application 125, for example, by evaluating biometric data (as described below) to allow the authorization application 125 to verify the identity of a customer using biometric data.

Hence, in a general sense, the biometric management application comprises instructions that are executable by a computer (which might be the host computer 110 and/or another computer in communication with the host computer 110) to manage biometric data in accordance with embodiments of the invention. Merely by way of example, in some embodiments, the biometric management application 130 is configured to serve as an interface for a database 135 of biometric data, for example, by receiving biometric data (e.g., data generated and/or interpreted by a biometric capture device 115) to be stored by the database and/or control access (e.g., by other applications) to the biometric data in the database 135. The biometric management application 130 may also be configured to correlate the biometric data with a set of biographical information about a customer. In an aspect, the biometric management application implements a set of biometric data matching techniques that can be used compare a set of biometric data with a historical set of biometric data to authenticate and/or validate the identity of a customer, and/or the like.

Hence, the biometric management application 130 may be configured to store data (including, for example, biometric data and/or associated biographical information) in a biometric database 135 or similar data store. In one aspect, the biometric database 135 may be isolated from other portions of the system 100 (e.g., the biometric management application 130 may be the only point of entry for the biometric database 135 and/or the only way to access biometric data in the database 135). Hence, an identifier, such as a customer identification number, may be used as a key to reference biometric data stored in the biometric database 135. This key can be provided (e.g., by the authorization application 125) to the biometric management application 130, which then can perform a search for the matching biometric data. The correlation between the customer identification number and the biometric data might be maintained only by the biometric management application 130 and/or in the biometric database 135—in this way, the system 100 can maintain security over the biometric data stored in the database 135.

It should be appreciated as well that the system 100 might store other types of data (in particular, data common to financial transactions) in one or more additional databases. Merely by way of example, a transaction database 140 might be used to store data about transactions (e.g., amount of transaction, payer and payee, financial institutions involved, whether the transaction has cleared, etc.). In some cases, a single database might be used to store both biometric data and other types of data. In other cases a first database 135 might be used to store biometric data (and/or associated biographical information), while one or more other databases might be used to store other types of data. In certain embodiments, data storage arrangements can be considered discretionary.

In some embodiments, the host computer 110 (and, in particular aspects, the authorization application 125) might be configured to evaluate check cashing requests based both on contemporary data about the requested transaction and historical data about the relevant parties (e.g., the customer, the entity that wrote the check, their respective financial institutions, and/or the like). Merely by way of example, a check processor (and, specifically the host computer 110 and/or authorization application 125) might use a variety of information in determining whether to recommend a merchant accept a check cashing request. This information falls into several categories related to both the customer and the Bank Account on which the check has been written. Examples of this type of information for the customer can include, without limitation, the number of checks presented for cashing in a certain time period, amount of the check to be cashed and customer's personal check writing (and/or check cashing) history, including any instances of suspected fraud, returned checks, and/or the like. Examples of information related to the presentation instrument can include, without limitation, recognizable bank account formatting, amount of the instrument, geographic location of the check cashing request, and/or past fraudulent use of the bank account on which the instrument is drawn. Data for performing such analyses might be stored in one or more risk profile databases 145 and/or other appropriate data stores. Hence, the risk profile database 145 can be used to store, inter alia, data about check cashing activities, check writing activities, and/or other direct deposit activities of various check-writing entities (which can include, but are not necessarily limited to, customers enrolled in the check writing program).

The arrangement of components in the system 100 is discretionary, and one skilled in the art will appreciate that a variety of such arrangements might be employed in accordance with different embodiments of the invention and/or implementation requirements. Exemplary hardware arrangements of the POS devices 105, host computer 110 and databases are described in further detail below with respect to FIGS. 5 and 6.

Figure 2:
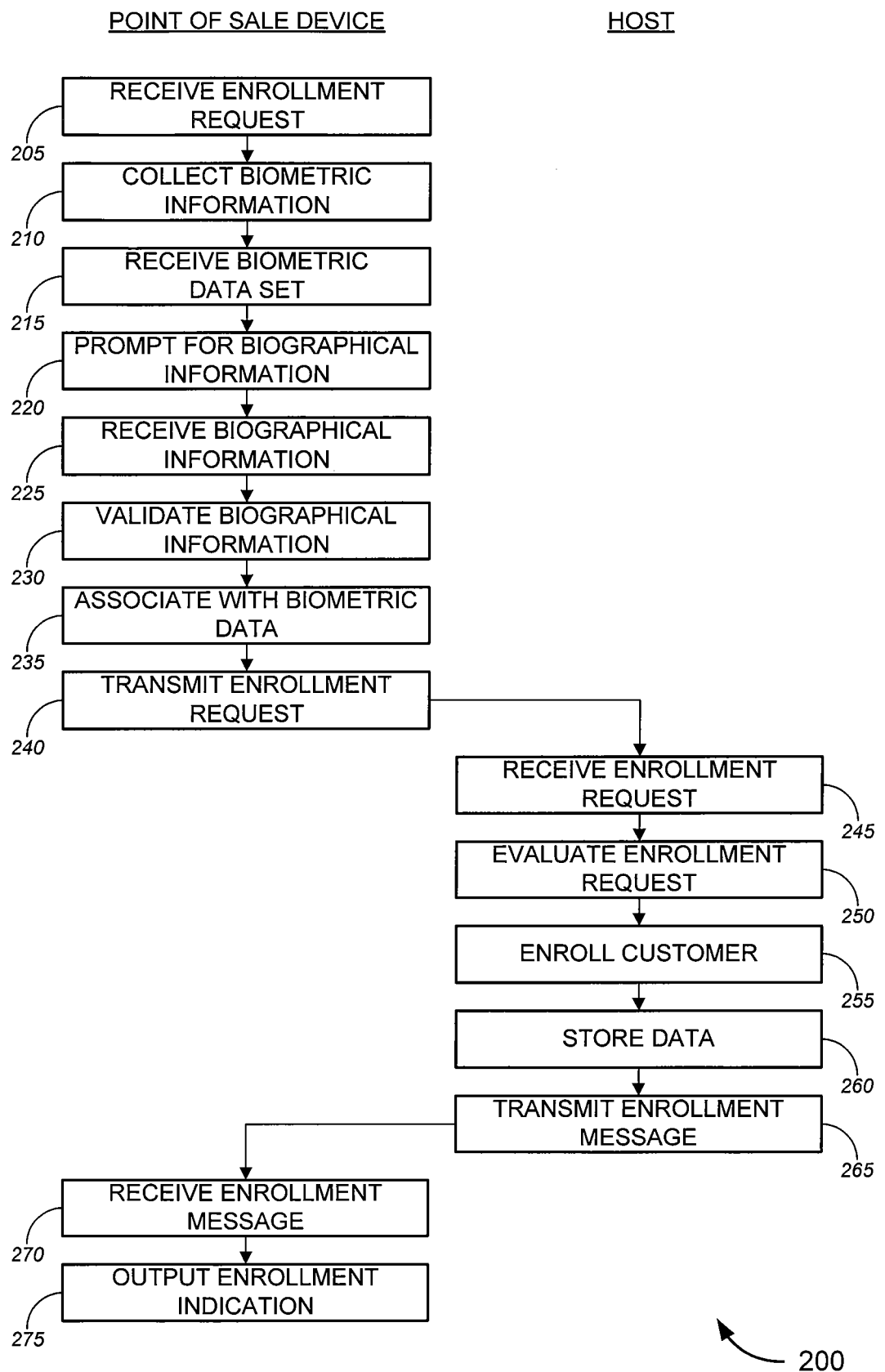
FIG. 2 is a process flow diagram illustrating a method of enrolling a customer in an authenticated check cashing program, in accordance with various embodiments of the invention.
Figure 3:
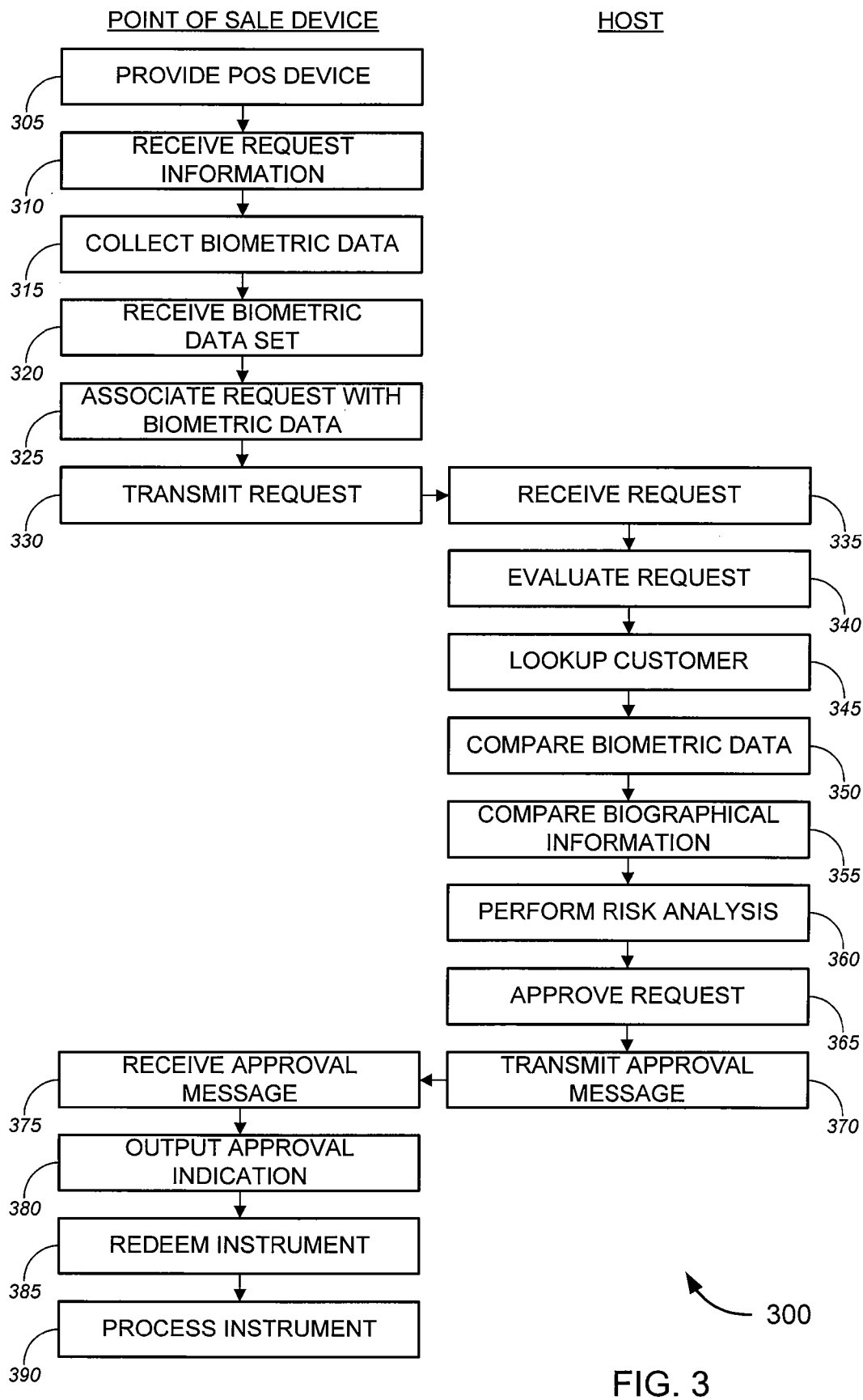
FIG. 3 is a process flow diagram illustrating a method of authorizing a check cashing request and, optionally, redeeming a presentation instrument, in accordance with various embodiments of the invention.
Figure 4:
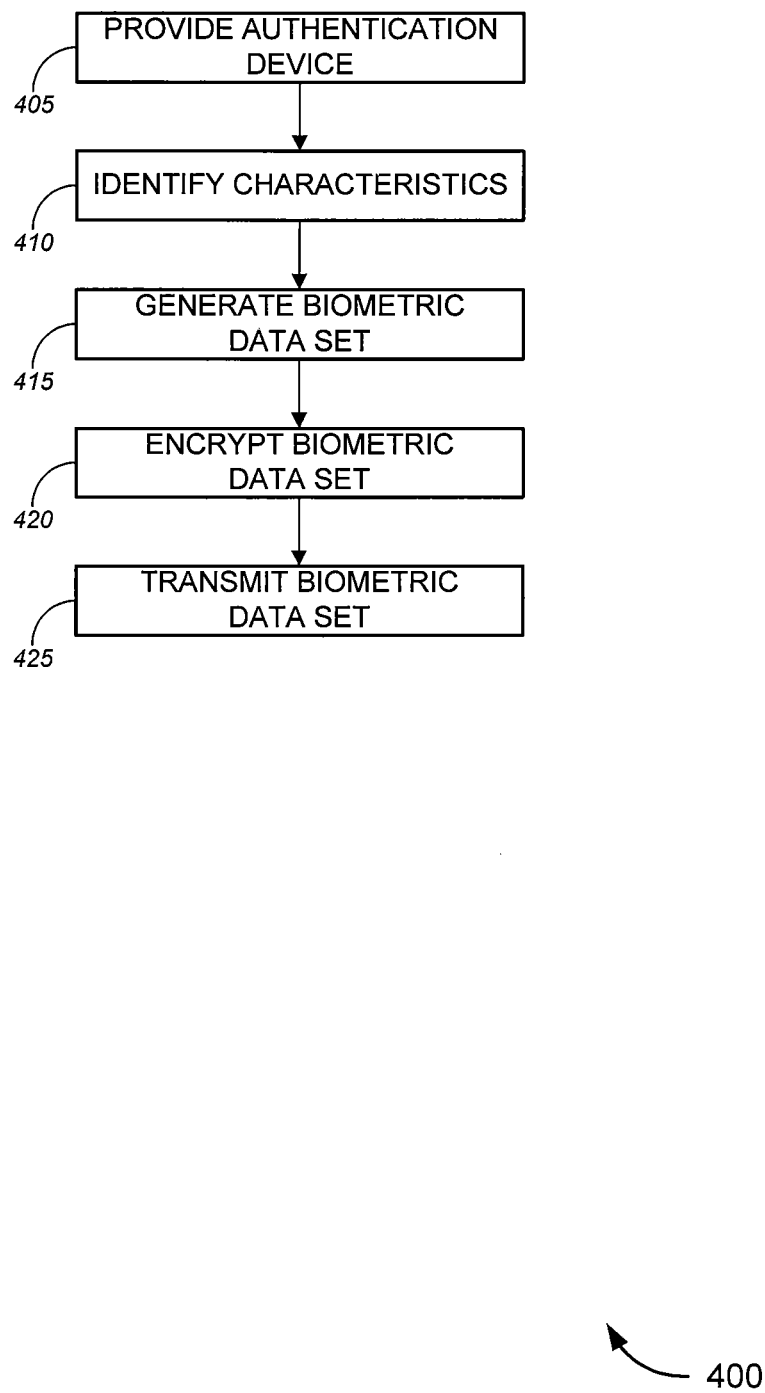
FIG. 4 is a process flow diagram illustrating a method of collecting biometric data, in accordance with various embodiments of the invention.

FIGS. 2-4 generally illustrate procedures that are performed by the system 100 (and/or various components thereof) in accordance with specific embodiments of the invention, and FIGS. 2-4, therefore, are often described below by reference to the system 100 of FIG. 1 and/or components thereof. It should be appreciated, however, that the methods depicted by FIGS. 2-4 can be implemented by any suitable computer system and are not limited to any particular functional or structural arrangement. Likewise, the system 100 can be configured to operate in a variety of different configurations, and the operation of the system 100 therefore should not be considered to be limited to the procedures described below with respect to FIGS. 2-4.

FIG. 2 illustrates a method 200 of enrolling a customer in an authenticated check cashing program, in accordance with one set of embodiments. The method comprises receiving an enrollment request from a customer (block 205). In an aspect, the enrollment request is received at a POS device, for example by receiving input (e.g., keystrokes) from a customer and/or a merchant operator indicating that the customer would like to enroll in the check cashing program.

In response to receiving the enrollment request, the POS device, in an embodiment, prompts the customer to provide a biometric data sample via a biometric capture device in communication with (and/or incorporated in) the POS device. The customer's biometric information is then collected by the biometric capture device (block 210), and the POS device receives a biometric data set from the biometric capture device (block 215). (FIG. 4, described below, illustrates one method of generating a biometric data set from a customer's physical characteristic(s).)

At block 220, the POS device prompts the customer (and/or a merchant operator) to provide a set of biographical information for the customer. This prompt might comprise, for example, a message on a display of the POS device. The POS device then receives a set of biographical information about the customer (block 225). In an embodiment, receiving the biographical information comprises receiving information from the customer and/or a merchant operator, using—for example—one or more of the data input devices described above. Biographical information can include a variety of information. Merely by way of example, biographical information might include the customer's name, address, phone number, bank account number, a customer identification number, a password, and/or the like. In some cases, the biographical information will include an identifier from some sort of third-party (e.g., governmental) identification, such as a social security number, driver's license number, Mexican Matricula Consular identification number, and/or the like, which can be used to authenticate the purported identity of the customer. In an aspect, this third-party identification is a photographic identification (i.e., the third party identification includes a photograph of the customer).

Optionally, the biographical information may be validated (block 230). Merely by way of example, in one embodiment, the POS device prompts a merchant operator to examine a photographic identification (such as the third-party identification described above) to verify that the photograph matches the customer. The operator, in response to the prompt may confirm (e.g., via keystroke) to the POS device that the operator has examined the photographic identification and confirmed that the photograph matches the appearance of the customer, and that the identity on the photographic identification matches the purported identity of the customer. An identification number of the photographic identification may be received from the operator as well.

The biographical information is then associated with the set of biometric data received from the biometric capture device (block 235). In an aspect, associating the set of biometric data with the biographical information comprises preparing an enrollment request that includes at least a portion of both the biometric data and the biographical information. The format of this enrollment request is discretionary.

The POS device then transmits the enrollment request to the host for approval (block 240). As noted above, the enrollment request might comprise some or all of the biometric data set and/or some or all of the biographical information. Any of a variety of techniques and/or protocols can be used to transmit the enrollment request. Merely by way of example, in some cases, the POS device and the host might each comprise a modem, and the enrollment request might be transmitted encoded by the POS device's modem and transmitted via a public switched telephone network ("PSTN") to the host computer's modem, which receives and decodes the transmission. In another embodiment, the POS device and the host computer might be in communication via a data network (such as the Internet, an intranet, a local area network, wide area network, virtual private network, and/or the like), and the enrollment request might be transmitted in any format/protocol supported by that network (e.g., SNA, TCP/IP, etc.).

Upon receiving the enrollment request (block 245), the host computer (and, in a particular aspect, the authorization application) evaluates the enrollment request (block 250). Evaluating the enrollment request can comprise a variety of operations. Merely by way of example, one technique for evaluating the enrollment request can comprise searching a biometric database for any biometric data sets matching the biometric data set provided with the enrollment request. (In an aspect, a biometric management application performs this search pursuant to a request/instruction from the authorization application.) If such a data set is found, the biographical information in the enrollment request might be compared with a set of biographical information associated with the biometric data in the database; if the information matches, the customer is already enrolled, so further enrollment may be unnecessary. If the biographical information does not match, this mismatch might be considered an indication of attempted fraud, and the enrollment request likely would be declined. If the biometric data does not match any existing biometric data sets in the database, the biometric management application might assign a customer number to the biometric data set and store the biometric data set in the biometric database. This customer number may then be provided to the authorization application.

Additionally and/or alternatively, the authorization application may perform other techniques that can be used to evaluate the enrollment request. For instance, a third party identifier (such as a driver's license number, Mexican Matricula Consular identification number, social security number) provided with the enrollment request can be evaluated for validity, either algorithmically (if, for example, the third party identifier is required to have a certain format, checksum value, etc. to be considered valid), by comparison with a database of valid identifier values, etc.

In some cases, evaluating the enrollment request comprises evaluating the request against a risk profile. The risk profile, in an aspect, is generated from a database that includes information about financial activities of various parties (such parties can include, but are not necessarily limited to, the customer). For example, as noted above, in a set of embodiments, the check cashing processor maintains a risk profile database of historical information about check cashing and/or check writing activities. In such embodiments, the host computer (and/or an associated computer) may be configured to search the risk profile database for the customer (by using, for example, the customer identification number and/or other biographical information provided with the enrollment request); if historical information about the customer is found in the risk profile database, the risk factors associated with that customer can be evaluated to determine whether enrolling the customer in the check cashing program presents an unacceptable level of risk (risk of fraud, bad checks, etc.). If this risk is unacceptably high, the enrollment request is denied.

In evaluating the risk profile of the customer, the authorization application might consider any of a number of risk factors related to that customer, including, merely by way of example, the customer's check writing history (number of checks written, velocity of check writing activity, any history of unpaid checks, any other history of fraudulent activity, such as writing checks on invalid accounts, and/or the like). Other risk factors that can be considered relate to the customer's check cashing history, including specifically a number and/or velocity of presentation instruments presented for redemption by the customer, past attempts to redeem unpayable presentation instruments, and/or the like. It should be noted that risk factors can be either negative (i.e., indicating a relatively greater risk), such as the factors mentioned above, or positive (i.e., indicating a relatively lower risk), such as a long history with no negative activities, and/or the like.

If the host computer determines, based on the evaluation of the enrollment request, that the customer should be enrolled in the authenticated check cashing program, the host computer enrolls the customer in the program (block 255). As part of the enrollment process, the host computer may store data about the customer, including, for example some or all of the customer's biographical information and/or some or all of the biometric data about the customer (block 260). For instance, some or all of this information may be stored in a biometric database. (In some cases, the biographical information is stored in a first database and the biometric data is stored in a separate database; in other cases, all of this information/data may be stored in the same database. In either case, however, the host computer will generally create some sort of association (such as a relational link, common key value etc.) between the customer's biographical information and the customer's biometric data.

Enrolling the customer in the program can comprise other operations as well. For example, a customer identification number may be assigned to the customer, as described above, and/or stored in one or more databases (for example, as a key value linking the biometric data and the biographical information). This customer identification number optionally may be provided to the customer and/or may be required to process future check cashing transactions (such as the transaction described with respect to FIG. 3, below, for example).

At block 265, the host computer transmits an enrollment message to be received by the POS device that transmitted the enrollment request. In an aspect, the enrollment message indicates an enrollment status (e.g., successful, failed, disapproved, etc.) In another aspect, the enrollment message might include a customer number assigned to the customer (assuming that the request was approved). Upon receiving the enrollment message (block 270), the POS device may output, for the customer and/or a merchant operator, an enrollment indication (block 275). Merely by way of example, the POS might display (e.g., on a display device) a visual indication that the enrollment has been approved and/or processed, and/or the POS device might print (e.g., on an attached printer) a receipt indicating the status of the enrollment.

Once the enrollment process 200 of FIG. 2 has been completed, the customer may then participate in an authenticated check cashing program supported by embodiments of the invention. Merely by way of example, if the customer subsequently wishes to redeem a presentation instrument, the user can return to the same merchant location (or visit a different merchant and/or location, so long as the new merchant/location also participates in the authenticated check cashing program as well) and present a presentation instrument for redemption.

FIG. 3 illustrates one exemplary method 300 of authorizing a check cashing request and/or redeeming a presentation instrument, in accordance with another set of embodiments. In an aspect, the method 300 may be performed after the method 200 illustrated by FIG. 2 has been completed, although this is not required. In another aspect, the method 300 comprises several operations similar to corresponding operations performed in accordance with the method 200 of FIG. 2. Such operations are described in detail above and need not be described in similar detail at this point.

For example, in an aspect of some embodiments, portions of the method 300 are performed as a series of interactions between a POS device and a host computer, somewhat similar to the transactions described above (although the content of the interactions differs). In an aspect, a POS device used in performance of the method 300 may be either the same or a different POS device than the POS device from which the enrollment request is made in accordance with the method 200 of FIG. 2. Hence, in some embodiments, the method 300 might include providing either the same POS device or another POS device (block 305), in a fashion similar to that described above.

The method 300 further comprises receiving (e.g., at this POS device) a set of information concerning a request ("a check cashing request") from a customer to redeem a presentation instrument (block 310). The information (referred to herein as "request information") often will comprise information about the presentation instrument itself, such as a check number, an institution on which the check is drawn, a name of an account holder of the account on which the check is drawn (i.e., the "check writer"), and/or the like. The set of request information, in some cases, may also comprise biographical information about the customer (which can include some or all of the types of biographical information discussed above with respect to enrollment requests), although this is not required, as noted below.

The method 300 further comprises collecting a set of biometric information, e.g., at a biometric capture device (block 315), receiving a biometric data set at the POS device (block 320), and associating the check cashing request with the biometric data set (block 325). These operations, in an embodiment, are performed in similar fashion to the corresponding operations described above with respect to blocks 210, 215 and 235, respectively, although in this case the biometric data set is associated with the set of request information, rather than merely with a set of biographical information, as in the case of an enrollment request. (As noted above, the process described with respect to FIG. 4, below, can be used to collect and/or generate the biometric data set.) Similarly, at block 330, the request is transmitted from the POS device to the host computer. Although the content of the message is different in the context of a check cashing request, the procedure for transmitting the message is similar to the procedure described above with respect to block 240.

Upon receiving the request (block 335), the host computer evaluates the check cashing request (block 340). In one aspect, the evaluation process includes looking up the customer who is the subject of the request (block 345). In some embodiments, the customer can be identified based on any biographical information provided as part of the check cashing request. In other embodiments, looking up the customer can comprise comparing the biometric data provided with the request information with previously-stored biometric data in the biometric database (block 350), e.g., by searching the biometric database to identify a biometric data set matching the biometric data set provided with the request information. In one aspect, the record identified by the host computer might comprise the biographical information about the customer stored at block 260, above, and/or might comprise the customer identification number for that customer. In another aspect, the biometric management might then provide to the authorization application the customer number in the biometric database that corresponds to the biometric data set matching the request.

Optionally, in some embodiments, evaluating the request can comprise comparing biographical information submitted as part of the request with previously-stored biographical information (block 355) (e.g., biographical information that correlates to the customer identification number identified by the biometric application as matching the biometric data set provided with the request information). This can provide an additional safeguard against fraud, by requiring multiple means of identification (i.e., biographical information and biometric data) in the check cashing request process.

In other embodiments, however, no biographical information need be provided with the check cashing request—the biometric data set might be sufficient to identify the customer, as described above, since the biometric database (and/or another database) already provides a correlation between the biometric data and the customer's biographical information (the customer identification number can be used as the correlating factor, as noted above), and the biometric data set, in an aspect, may be considered to be practically unique to the customer. In this way, embodiments of the invention can be used to save time and/or inconvenience, and/or reduce the possibility of data input error, by relieving the customer (and/or merchant operator) of having to input biographical information with the check cashing request.

Hence, as one part of evaluating the request, the host computer can validate the identity of the customer making the request, by reference to either the biographical information about the customer and/or a biometric data set about the customer. In one aspect, the biometric management application can be used to compare biometric data sets (e.g., by comparing points of similarity in fingerprints, etc.). It should be appreciated that the techniques used to compare biometric data generally will vary according to the nature of the biometric data; a variety of techniques are known in the art for analyzing various types of biometric data, and any of these techniques can be used in accordance with various embodiments of the invention.

By comparing data collected at the time of the check cashing request with data collected previously, the host computer can authenticate the identity of the customer with a relatively high degree of confidence, especially if the compared data includes practically unique biometric data. If the identity of the customer cannot be authenticated and/or validated, the host computer generally will deny the check cashing request.

If the customer's identity is authenticated and/or validated (for example, using the procedures described above), the host computer may be configured (e.g., by the authorization application) to perform additional procedures to evaluate the request. Merely by way of example, the evaluation of the check cashing request might comprise performing some sort of risk analysis of the requested check cashing transaction (block 360). One example of such risk analysis is an evaluation of the request against a risk profile. As noted above, a risk profile evaluation may be used in the evaluation of the original enrollment request. A second risk profile evaluation (which might analyze some or all of the risk factors used in evaluating the original enrollment request) can be performed as part of evaluating the check cashing request as well. This risk profile evaluation can include an evaluation of a risk profile factors associated with the customer (as described above with respect to the enrollment process).

In addition, the risk profile evaluation of the check cashing request might include an evaluation of risk factors that are related to the requested transaction as well. These risk factors may be derived from historical information stored in the risk profile database, as described above, as well as the characteristics of the transaction itself. Merely by way of example, the risk profile evaluation for the transaction might include analysis of the presentation instrument. For instance, the amount of the presentation instrument can be compared with historical amounts of presentation instruments drawn on the same account and/or cashed by the same customer. Another risk factor to be considered is whether the presentation instrument has recognizable bank account information formatting (such as valid MICR printing, valid account and/or RTN numbers, etc.) As another example, historical data about the account (such as check velocity—the number of presentation instruments drawn over a given period of time, a history of fraudulent use of a bank account associated with the presentation instrument, and/or the like) can be considered during the evaluation. The geographical location of the check cashing request may also be considered (e.g., if the customer is attempting to cash a check outside the normal area in which the customer attempts to cash checks, this variance could be considered a possible risk indicator.

Based on the evaluation of the check cashing request, the host computer determines whether to approve the request (block 360), deny the request, or, optionally, indicate to the POS device that further information about the customer and/or the transaction is needed. Assuming the request is approved, the host computer transmits an approval message to be received by the requesting POS device (block 370); alternatively, if the request is not approved, a declination message, a prompt for more information, etc., may be transmitted instead.

Upon receiving the approval message (block 375), the POS device outputs an approval indication (block 380), e.g., in a fashion similar to the output described above at block 275. Upon receiving the approval indication, the merchant redeems the presentation instrument (block 385), for example, by exchanging cash for the endorsed presentation instrument, funding a pre-paid card, directly paying bills on behalf for the check cashing customer, and/or the like. The presentation instrument then is processed (block 390), in any number of ways, including, merely by way of example, via an automated clearinghouse ("ACH") settlement; a back office conversion ("BOC") process; an electronic settlement process; check truncation, substitute check and/or image replacement document processes (as allowed by the Check Clearing for the 21st Century Act, for example); direct deposit at the merchant's bank; and/or the like.

As noted above, there are a variety of techniques by which biometric data may be collected in accordance with embodiments of the invention. FIG. 4 illustrates a method 400 of collecting biometric data and providing that data to a POS device (or any other suitable device, in accordance with a set of embodiments. It should be noted that the method 400 of FIG. 4 (or similar methods) may be incorporated within the methods 200 and/or 300 described above. (Similarly, the methods 200 and 300 may be consolidated, in some embodiments, into a single method, and/or various procedures of the described methods can be combined to form different methods in accordance with various embodiments of the invention.)

The method 400 comprises providing a biometric capture device (block 405). Providing a biometric capture device can comprise any of several actions, including without limitation one or more of the following: installing a biometric capture device, providing and/or maintaining communication between such a biometric capture device and a POS device, accessing a biometric capture device to provide biometric data to the device, and/or the like. As noted above, any of a number different types of biometric capture devices can be used in accordance with various embodiments of the invention.

The method 400 further comprises identifying, with the biometric capture device, one or more physical characteristics of the check-cashing customer (block 410). Depending on the type of device, any of a number of characteristics, including without limitation those mentioned above, may be identified by the biometric capture device. As used herein, the term "identifying one or more physical characteristics" includes any operations necessary to measure, ascertain, determine, identify, catalog, and/or analyze a physical characteristic (which can include, merely by way of example, a fingerprint, hand print and/or geometry, facial structure, iris pattern, retinal pattern, handwriting pattern, keystroke entry pattern, and/or the like) so as to enable the device to generate a data set that is practically unique to that customer. As used herein the term "identifying a physical characteristic" means any technique to ascertain, measure, sense, or otherwise obtain information about a physical characteristic of the customer. The techniques used by the biometric capture device to identify a physical characteristic necessarily will vary with the type of device and/or the physical characteristic being identified. As noted above, there are a variety of commercially-available biometric capture devices that are capable of identifying a physical characteristic, and any such appropriate device may be used in accordance with embodiments of the invention.

At block 415, a set of biometric data is generated from the one or more identified physical characteristics. In an embodiment, the set of biometric data (also referred to herein as a "biometric data set") is practically unique to the customer. In some cases, the biometric data set comprises one or more images, one or more sets of numeric data, and/or the like. In an aspect, the biometric data set represents and/or quantifies the identified physical characteristic(s) of the customer, allowing a representation of the physical characteristic(s) to be stored on a computer and/or for multiple data sets to be compared for similarities.

Optionally, the biometric data set may be encrypted (block 420). Encryption of the biometric data can protect the security of the data at the POS device, in transmission between the biometric capture device, the POS device and/or the host computer, and/or when stored/used at the host computer itself. (In an aspect, the data set may be decrypted later at the host computer, e.g., by the fingerprint management application.) Any of a variety of commercially-available and/or proprietary encryption techniques can be used. Merely by way of example an asymmetric encryption technique (such as RSA encryption, to name but one example) may be used, in which the biometric capture device maintains a public key, and the biometric management application at the host maintains a private key. The biometric data set is encrypted with the public key at the capture device, and the biometric management application uses the private key to decrypt the biometric data set. Other types of encryption, including without limitation as symmetric encryption techniques (e.g., AES encryption) and/or hybrid cryptosystems (i.e., a combination of asymmetric and symmetric encryption techniques may be used as well.

The biometric capture device then transmits the (possibly encrypted) biometric data set to the POS device (block 425) using any appropriate communication channel (such as a serial connection, parallel connection, USB connection, etc.). Of course, in embodiments in which the biometric capture device is incorporated within the point of sale device, this procedure might not be necessary.

Figure 5:
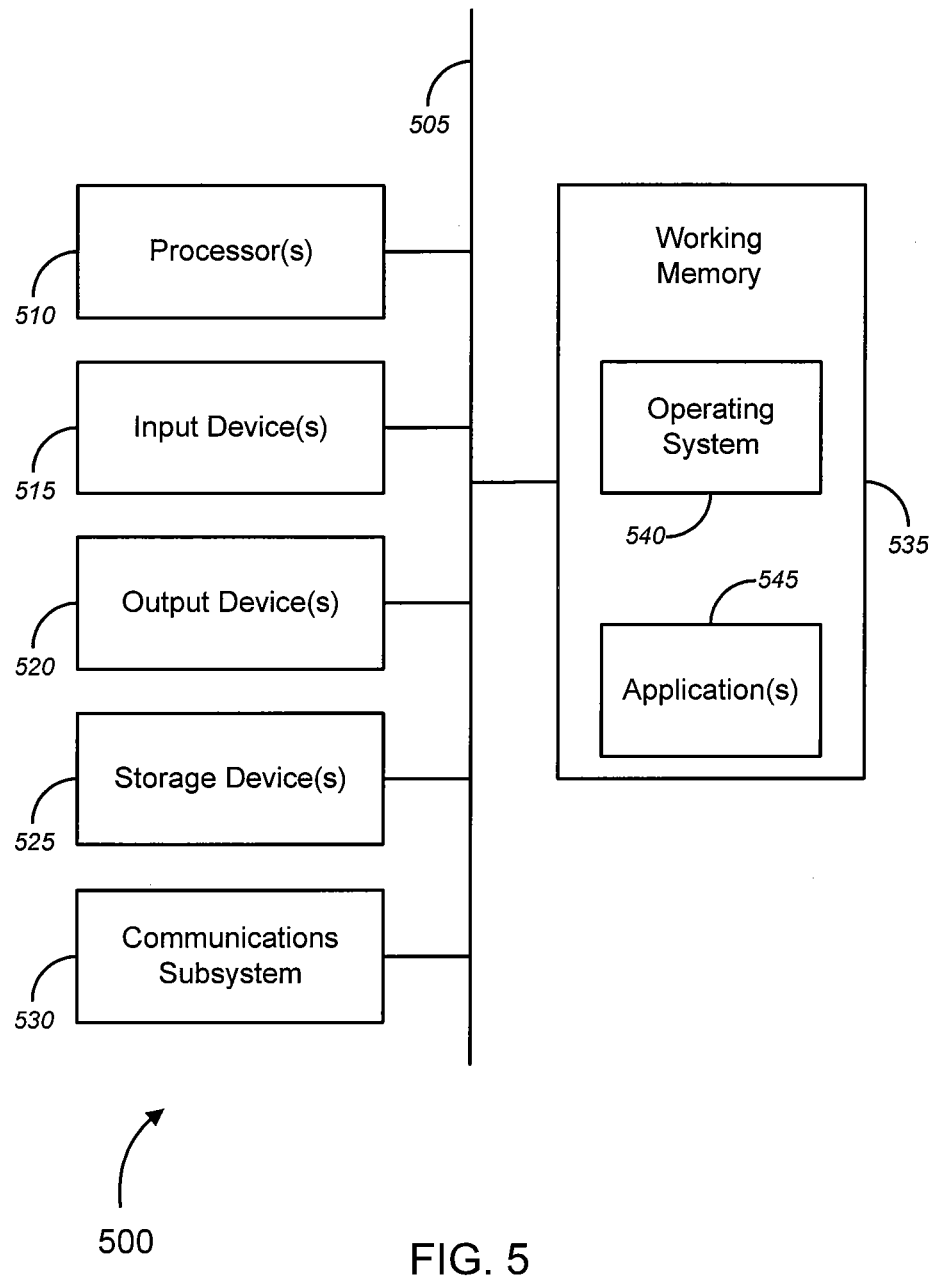
FIG. 5 is a generalized schematic diagram illustrating a computer system, in accordance with various embodiments of the invention.

FIG. 5 provides a schematic illustration of one embodiment of a device or computer system 500 that can perform the methods of the invention, as described herein, and/or can function as a POS device, host computer, and/or the like. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), a local communication facility (such as a serial port, parallel port, USB port, etc.) and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, firmware, software (including portable software, such as applets, etc.), or any combination thereof. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
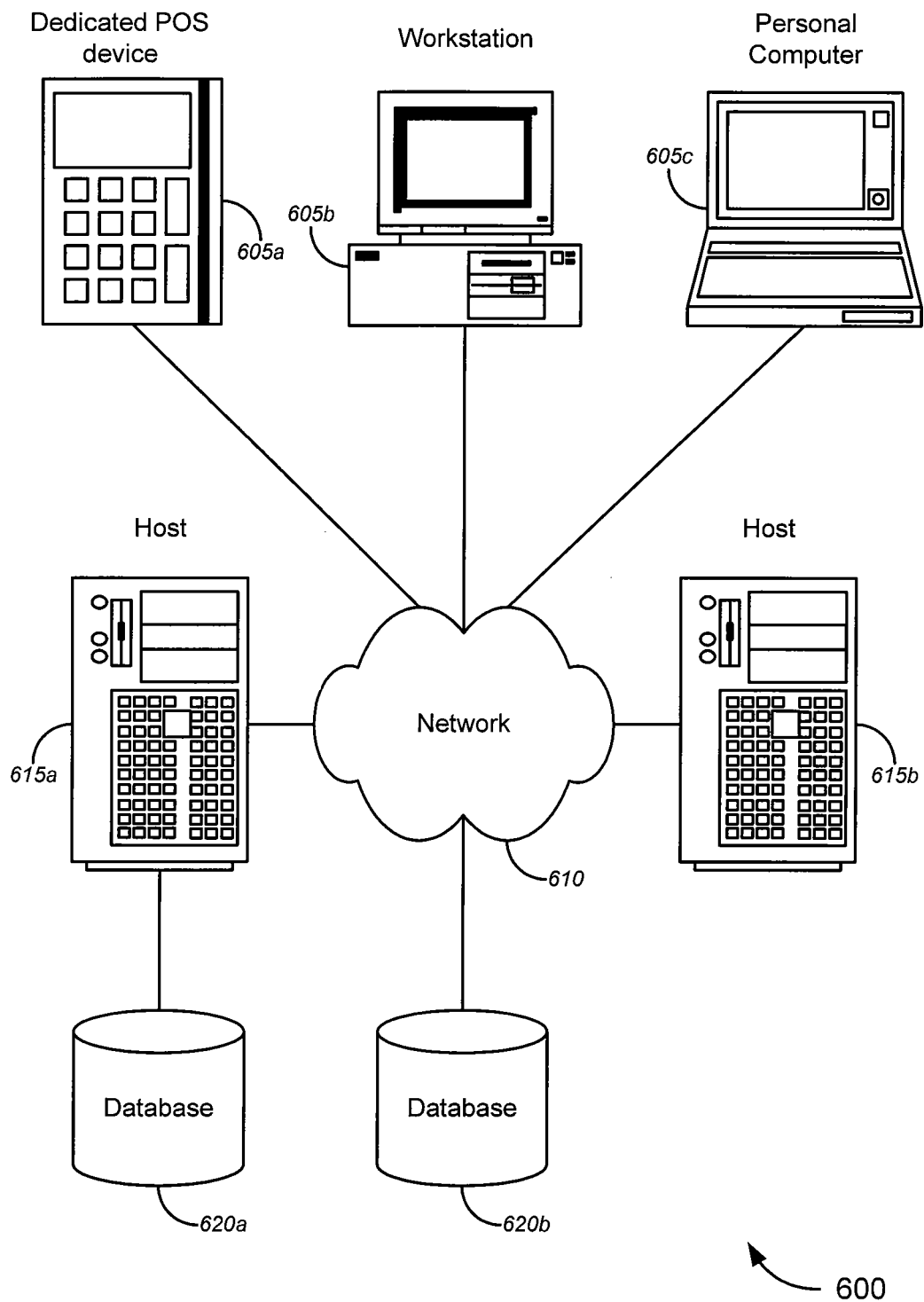
FIG. 6 is a block diagram illustrating a networked system of computers, which can be used in accordance with various embodiments of the invention.

FIG. 6 illustrates a schematic diagram of a system 600 that can be used in accordance with one set of embodiments. The system 600 can include one or more clients 605. In an aspect, a client 605 functions as a POS device described above. In some cases, a client is a dedicated POS device comprising specialized hardware, such as the Telecheck™ Eclipse™ and/or FD-2000™ payment terminals available from First Data Corp., and/or an electronic cash register with an integrated POS device. Alternatively, a client 605 might be a general purpose personal computer 605c (including, merely by way of example, personal computers and/or laptop computers running any appropriate flavor of Microsoft Corp.'s Windows™ and/or Apple Corp.'s Macintosh™ operating systems) and/or workstation computers 605b running any of a variety of commercially-available UNIX™ or UNIX-like operating systems. ("Dumb" terminals may be used as well.) Such personal computers 605c and/or workstations 605b might be configured with software to operate as POS devices. These computers 605b, 605c can also have any of a variety of applications, including one or more applications configured to perform methods of the invention. Although the exemplary system 600 is shown with three clients 605, any number of user clients can be supported.

Certain embodiments of the invention operate in a networked environment, which can include a network 610. The network 610 can be any type of network familiar to those skilled in the art that can support data communications, including in particular, communications between a host computer and one or more POS devices, including networks using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

As noted above, embodiments of the invention can include one or more host computers 615. Each of the host computers 615 may be configured with an operating system, including without limitation any of those discussed above, as well as any commercially (or freely) available server operating systems, mainframe operating systems, and/or the like. Each of the host computers 615 may also be running one or more applications (including without limitation those applications described above), which can be configured to provide services to one or more clients 605 and/or other hosts 615.

The host computers 615, in some embodiments, might include one or more application servers, which can include one or more applications accessible by a client running on one or more of the clients 605 and/or other hosts 615. Merely by way of example, the hosts(s) 615 can be one or more general purpose computers capable of executing programs or scripts in response to the clients 605 and/or other hosts 615. Merely by way of example, an can be implemented as one or more scripts or programs written in any suitable programming language, such as Java™, COBOL, C, C#™, or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from clients 605 and/or other hosts 615.

In certain embodiments, the system can include one or more databases 620, each of which might comprise one or more tables, an arrangement familiar to those of skill in the art. The location of the database(s) 620 is discretionary: merely by way of example, a database 620a might reside on a storage medium local to (and/or resident in) a host 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. In a relationship between a financial institution, a financial transaction provider, and a check-cashing customer, a method of approving a check-cashing request, the method comprising:
   providing a first biometric capture device in communication with a first point of sale device;
   receiving, at the first point of sale device, a biometric authentication enrollment request for the check-cashing customer;
   identifying, at the first biometric capture device, one or more physical characteristics of the check-cashing customer;
   generating, from the identified one or more physical characteristics, a first set of biometric data about the check-cashing customer;
   transmitting the first set of biometric data about the check-cashing customer from the first biometric capture device to the first point of sale device;
   receiving, at the first point of sale device, the first set of biometric data;
   prompting a user to provide a set of biographical information about the check-cashing customer, the set of biographical information comprising an identifier from a photographic identification;
   receiving, at the first point of sale device, the set of biographical information about the check-cashing customer;
   prior to transmitting an enrollment request, validating, at the first point of sale device, the set of biographical information about the check-cashing customer;
   associating the set of biographical information with the first set of biometric data;
   transmitting, from the first point of sale device to a host computer, the enrollment request comprising the associated set of biographical information and first set of biometric data;
   receiving, at the host computer, the enrollment request comprising the associated set of biographical information and first set of biometric data;
   evaluating, at the host computer, the enrollment request to determine whether either or both of the first set of biometric data and the set of biographical information match with information already stored at the host computer;
   validating, at the host computer, the photographic identification by comparing the photographic identification with a database of valid identifier values;
   evaluating, at the host computer, the enrollment request against a first set of risk factors based on the customer's check writing history prior to enrollment;
   determining, at the host computer, a first risk level of the enrollment request is not unacceptably high;
   enrolling the check-cashing customer at the host computer, based at least in part on an evaluation of the first set of biographical information;
   storing, via a biometric management application, the first set of biometric data in a biometric database at the host computer;
   storing the first set of biographical information in a second database, the biometric database being isolated from the second database;
   linking the first set of biometric data and the first set of biographical information via a customer identification number such that the biometric database is accessible only through the biometric management application via the customer identification number being provided to the biometric management application;

transmitting, from the host computer to the first point of sale device, an enrollment message indicating that the enrollment request has been approved;

transmitting the customer identification number from the host computer to the first point of sale device to provide the check-cashing customer with the customer identification number;

receiving the enrollment message at the first point of sale device;

displaying, at the first point, of sale device an enrollment indication to indicate that the enrollment request has been approved;

providing a second biometric capture device in communication with a second point of sale device;

receiving, at the second point of sale device, a set of request information concerning a request by the customer to redeem a presentation instrument, the set of request information comprising information about the presentation instrument and a second set of biographical information about the customer;

receiving, at the second point of sale device, the customer identification number from the check-cashing customer;

generating, at the second biometric capture device, a second set of biometric data about the customer;

transmitting the second set of biometric data from the second biometric capture device to the second point of sale device;

receiving the second set of biometric data at the second point of sale device;

associating the second set of biometric data with the set of request information;

transmitting the associated second set of biometric data and set of request information from the second point of sale device to the host computer;

receiving, at the host computer, the associated second set of biometric data and set of request information;

evaluating, at the host computer, the set of request information against a second set of risk factors based on the customer's historical information;

evaluating, at the host computer, the set of request information against a third set of risk factors based on the presentation instrument;

determining, at the host computer, a second risk level of the redemption request is not unacceptably high;

comparing, at the host computer, the second set of biographical information with the first set of biographical information;

comparing, at the host computer, the second set of biometric data with the first set of biometric data;

based at least in part on an evaluation of the set of request information, a comparison of the first set of biographical information with the second set of biographical information, and a comparison of the first set of biometric data with the second set of biometric data, approving the request to redeem the presentation instrument;

transmitting, from the host computer to the point of sale device an approval message indicating that the request to redeem the presentation instrument has been approved; and displaying, at the second point of sale device, an approval indication to indicate that the request to redeem the presentation instrument has been approved.

2. The method of claim 1, wherein the user is the check-cashing customer.

3. The method of claim 1, wherein the one or more biometric characteristics comprises a fingerprint.

4. The method of claim 3, wherein the set of biometric data comprises an image of the fingerprint.

5. The method of claim 1, wherein the one or more biometric characteristics are each selected from the group consisting of: a vein pattern, a hand geometry, an iris pattern, a facial structure, a handwriting pattern, and a keystroke entry pattern.

6. The method of claim 1, further comprising encrypting the first set of biometric data at the first biometric capture device and encrypting the second set of biometric data at the second biometric capture device.

7. The method of claim 1, further comprising validating, at the point of sale device, the set of biographical information about the check-cashing customer before transmitting the enrollment request.

8. The method of claim 1, wherein the first point of sale device and the second point of sale device are the same point of sale device, and wherein the first biometric capture device and the second biometric capture device are the same biometric capture device.

9. The method of claim 1, wherein the host computer is operated by the financial transaction provider.

10. The method of claim 1, wherein at least one of the point of sale devices is provided by the financial transaction provider.

11. The method of claim 1, wherein the third set of risk factors comprising one or more factors selected from the group consisting of: a number of presentation instruments presented for redemption by the check-cashing customer, an amount of the presentation instrument, whether the presentation instrument has recognizable bank account information formatting, a geographic location of the request to redeem the presentation instrument, and an amount of the presentation instrument.

12. The method of claim 1, wherein the first set of risk factors is generated from a database comprising data about check cashing activities, check writing activities, and other direct deposit account activities.

13. In a relationship between a financial institution, a financial transaction provider, and a check-cashing customer, a method of approving a check-cashing request, the method comprising:

transmitting, from a first point of sale device to a host computer, an enrollment request comprising a set of biographical information and a first set of biometric data;

receiving, at the host computer, the enrollment request comprising the associated set of biographical information and first set of biometric data;

evaluating, at the host computer, the enrollment request against a first risk profile that includes a set of risk factors based on historical information specific to the check-cashing customer stored in a risk profile database;

determining, at the host computer, a risk level of the enrollment request is not unacceptably high;

enrolling the check-cashing customer at the host computer;

storing the set of biographical information in a first database;

storing, via a biometric management application, the first set of biometric data in a biometric database at the host computer, the biometric database being isolated from the first database;

linking the first set of biometric data and the set of biographical information via a customer identification number such that the biometric database is accessible only through the biometric management application via the customer identification number being provided to the biometric management application;

transmitting the customer identification number from the host computer to the point of sale device to provide the check-cashing customer with the customer identification number;

receiving, at a second point of sale device, a set of request information concerning a request by the check-cashing customer to redeem a presentation instrument, the set of request information comprising information about the presentation instrument;

receiving, at the second point of sale device, the customer identification number from the check-cashing customer;

generating, at a biometric capture device in communication with the second point of sale device, a second set of biometric data about the check-cashing customer;

transmitting the second set of biometric data from the second biometric capture device to the second point of sale device;

receiving the second set of biometric data at the second point of sale device;

associating the second set of biometric data with the set of request information;

transmitting the associated second set of biometric data and set of request information from the second point of sale device to the host computer;

receiving, at the host computer, the associated second set of biometric data, the customer identification number, and the set of request information;

evaluating, at the host computer, the set of request information against a second risk profile;

accessing the first set of biometric data from the biometric database by providing the customer identification number to the biometric management application;

comparing, at the host computer, the second set of biometric data with the first set of biometric data;

based at least in part on an evaluation of the set of request information and a comparison of the first set of biometric data with the second set of biometric data, approving the request to redeem the presentation instrument;

transmitting, from the host computer to second the point of sale device an approval message indicating that the request to redeem the presentation instrument has been approved; and displaying, at the second point of sale device, an approval indication to indicate that the request to redeem the presentation instrument has been approved.

14. The method of claim 13, wherein the set of biographical information is a first set of biographical information, and wherein the set of request information further comprises a second set of biographical information about the check-cashing customer.

15. The method of claim 14, further comprising comparing, at the host computer, the second set of biographical information with the first set of biographical information;

wherein approving the request to redeem the presentation instrument is further based on a comparison of the second set of biographical information with the first set of biographical information.

16. The method of claim 13, wherein the set of biographical information comprises an identifier from a photographic identification.

17. In a relationship between a financial institution, a financial transaction provider, and a check-cashing customer, a method of approving a check-cashing request, the method comprising:

receiving, at a host computer, an enrollment request comprising a set of biographical information about the check-cashing customer and a first set of biometric data about the check-cashing customer;

evaluating, at the host computer, the set of biographical information against a first risk profile;

enrolling the check-cashing customer at the host computer, based at least in part on an evaluation of the first set of biographical information;

storing the set of biographical information in a first database;

storing, via a biometric management application, the first set of biometric data in a biometric database at the host computer, the biometric database being isolated from the first database;

linking the first set of biometric data and the set of biographical information via a customer identification number such that the biometric database is accessible only through the biometric management application via the customer identification number being provided to the biometric management application;

transmitting the customer identification number from the host computer to provide the check-cashing customer with the customer identification number;

receiving, at the host computer, a second set of biometric data and a set of request information associated with the second set of biometric data;

receiving, at the host computer, the customer identification number from the check-cashing customer;

evaluating, at the host computer, the set of request information against a second risk profile, wherein the evaluation against the second risk profile includes evaluating the velocity of presentation instrument redemptions by the check-cashing customer;

accessing the first set of biometric data from the biometric database by providing the customer identification number to the biometric management application;

comparing, at the host computer, the second set of biometric data with the first set of biometric data;

based at least in part on an evaluation of the set of request information and a comparison of the first set of biometric data with the second set of biometric data, approving the request to redeem the presentation instrument; and transmitting, from the host computer to a point of sale device, an approval message indicating that the request to redeem the presentation instrument has been approved, so that the point of sale device can display an approval indication.

18. In a relationship between a financial institution, a financial transaction provider, and a check-cashing customer, an apparatus, comprising:

a computer readable medium having a set of instructions encoded thereon, the set of instructions executable by a host computer to perform one or more operations, the set of instructions comprising:

instructions for receiving, at a host computer, an enrollment request comprising a set of biographical information about the check-cashing customer and a first set of biometric data about the check-cashing customer;

instructions for evaluating, at the host computer, the set of biographical information against a first risk profile, wherein the first risk profile includes evaluating bad checks written by the check-cashing customer prior to enrollment;

instructions for enrolling the check-cashing customer at the host computer, based at least in part on an evaluation of the first set of biographical information;

instructions for storing the set of biographical information in a first database;
instructions for storing, via a biometric management application, the first set of biometric data in a biometric database at the host computer, the biometric database being isolated from the first database;
instructions for linking the first set of biometric data and the set of biographical information via a customer identification number such that the biometric database is accessible only through the biometric management application via the customer identification number being provided to the biometric management application;
instructions for transmitting the customer identification number from the host computer to provide the check-cashing customer with the customer identification number;
instructions for receiving, at the host computer, a second set of biometric data and a set of request information associated with the second set of biometric data;
instructions for receiving, at the host computer, the customer identification number from the check-cashing customer;
instructions for evaluating, at the host computer, the set of request information against a second risk profile;
instructions for accessing the first set of biometric data from the biometric database by providing the customer identification number to the biometric management application;
instructions for comparing, at the host computer, the second set of biometric data with the first set of biometric data;
instructions for based at least in part on an evaluation of the set of request information and a comparison of the first set of biometric data with the second set of biometric data, approving the request to redeem the presentation instrument; and
instructions for transmitting, from the host computer to a point of sale device, an approval message indicating that the request to redeem the presentation instrument has been approved, so that the point of sale device can display an approval indication.

19. In a relationship between a financial institution, a financial transaction provider, and a check-cashing customer, a system for approving a check-cashing request, the system comprising:
   a host computer system, comprising one or more first processors, a communication interface in communication with the one or more first processors, a data store in communication with the one or more first processors, and one or more first computer readable media in communication with the one or more first processors, the one or more first computer readable media comprising a first set of instructions executable by the host computer system to perform one or more operations, the first set of instructions comprising:
   instructions for receiving, via the communication interface, an enrollment request comprising a set of biographical information about the check-cashing customer and a first set of biometric data about the check-cashing customer;
   instructions for evaluating the set of biographical information against a first risk profile;
   instructions for enrolling the check-cashing customer, based at least in part on an evaluation of the first set of biographical information;
   instructions for storing the set of biographical information in a first database:
   instructions for storing, via a biometric management application, the first set of biometric data in a biometric database at the host computer system, the biometric database being isolated from the data store and from the first database;
   instructions for linking the first set of biometric data and the set of biographical information via a customer identification number such that the biometric database is accessible only through the biometric management application via the customer identification number being provided to the biometric management application;
   instructions for receiving, via the communication interface, a second set of biometric data and a set of request information associated with the second set of biometric data;
   instructions for receiving, via the communication interface, the customer identification number from the check-cashing customer;
   instructions for evaluating the set of request information against a second risk profile, wherein the second risk profile involves an evaluation of:
      a geographical location of the check cashing request,
      whether a check associated with the check cashing request has recognizable bank account information, and
      a check cashing velocity associated with the check-cashing customer;
   instructions for comparing the second set of biometric data with the first set of biometric data;
   instructions for approving the request to redeem the presentation instrument, based at least in part on an evaluation of the set of request information and a comparison of the first set of biometric data with the second set of biometric data; and
   instructions for transmitting, via the communication interface, an approval message indicating that the request to redeem the presentation instrument has been approved, so that the point of sale device can display an approval indication.

20. The system of claim 19, wherein the data store comprises one or more database tables.

21. The system of claim 19, further comprising:
   a biometric capture device configured to identify one or more physical characteristics of the check-cashing customer and generate, from the identified one or more physical characteristics, the first set of biometric data about the check cashing customer; and
   a point of sale device in communication with the host computer system and the biometric capture device, the point of sale device comprising a second processor and a second computer readable medium, the second computer readable medium comprising a second set of instructions executable by the point of sale device to perform one or more operations, the second set of instructions comprising:
   instructions for receiving a biometric authentication enrollment request for the check-cashing customer;
   instructions for communicating with the biometric capture device to receive the first set of biometric data for the check-cashing customer;
   instructions for prompting a user to provide a set of biographical information about the check-cashing customer;

instructions for receiving the set of biographical information about the check-cashing customer;

instructions for associating the set of biographical information with the first set of biometric data; and instructions for transmitting, to the host computer system, an enrollment request comprising the associated set of biographical information and first set of biometric data.

22. The system of claim 21, wherein the point of sale device comprises the biometric capture device.

23. The system of claim 19, further comprising:

a biometric capture device configured to identify one or more physical characteristics of the check-cashing customer and generate, from the identified one or more physical characteristics, the second set of biometric data about the check cashing customer; and a point of sale device in communication with the host computer system and the biometric capture device, the point of sale device comprising a second processor and a second computer readable medium, the second computer readable medium comprising a second set of instructions executable by the point of sale device to perform one or more operations, the second set of instructions comprising:

instructions for receiving a set of request information concerning a request by the customer to redeem a presentation instrument, the set of request information comprising information about the presentation instrument;

instructions for communicating with the biometric capture device to receive a second set of biometric data about the customer;

instructions for associating the second set of biometric data with the set of request information;

instructions for transmitting the associated second set of biometric data and set of request information to the host computer system;

instructions for transmitting the customer identification number to the host computer system;

instructions for receiving, from the host computer system, the approval message indicating that the request to redeem the presentation instrument has been approved; and instructions for displaying an approval indication to indicate that the request to redeem the presentation instrument has been approved.

24. The method of claim 1, further comprising searching a risk profile database for the check-cashing customer by using the customer identification number.

* * * * *